United States Patent
Ng et al.

(10) Patent No.: US 11,182,048 B2
(45) Date of Patent: Nov. 23, 2021

(54) SCOPED VIEW OF FILE TREE

(71) Applicant: Microsoft Technology Licensing, LLC, Redmond, WA (US)

(72) Inventors: Andrew C. Ng, Redmond, WA (US); Mark Wade Heninger, Preston, WA (US); Smitha Bhat Bharadwaj, Sammamish, WA (US); Alan Jinsoo Yu, Bellevue, WA (US); Arijit Chatterjee, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/414,620

(22) Filed: May 16, 2019

(65) Prior Publication Data

US 2020/0363912 A1 Nov. 19, 2020

(51) Int. Cl.
*G06F 3/0482* (2013.01)
*G06F 3/0484* (2013.01)
*G06F 16/16* (2019.01)
*G06F 16/185* (2019.01)

(52) U.S. Cl.
CPC ........ *G06F 3/0482* (2013.01); *G06F 3/04845* (2013.01); *G06F 16/168* (2019.01); *G06F 16/185* (2019.01)

(58) Field of Classification Search
CPC .. G06F 3/0482; G06F 3/04845; G06F 16/168; G06F 16/185
See application file for complete search history.

(56) References Cited

U.S. PATENT DOCUMENTS

| | | | |
|---|---|---|---|
| 9,304,649 B2* | 4/2016 | Scherpa | ................ G06F 3/0481 |
| 2003/0218641 A1* | 11/2003 | Longobardi | ............ G06F 16/10 |
| | | | 715/853 |
| 2004/0239683 A1 | 12/2004 | Chu et al. | |

(Continued)

OTHER PUBLICATIONS

Abhishek Prakash, "Hide Folders and Show Hidden Files in Ubuntu Linux", published to web no later than Apr. 2, 2019 at https://itsfoss.com/hide-folders-and-show-hidden-files-in-ubuntu-beginner-trick/, retrieved Jun. 10, 2020 (Year: 2019).*

(Continued)

*Primary Examiner* — Shourjo Dasgupta
(74) *Attorney, Agent, or Firm* — Alleman Hall Creasman & Tuttle LLP

(57) ABSTRACT

A computing device including a user input device. The computing device may further include memory storing a file tree that includes a plurality of files arranged in a hierarchical structure having a plurality of nodes. The computing device may further include at least one processor configured to receive, via the user input device, a scoping selection of one or more nodes of the plurality of nodes. The scoping selection may indicate a respective display status for each of the one or more nodes. The processor may generate a scoped view of the file tree in which for each selected node, whether that selected node is displayed or hidden in the scoped view is determined based at least on the respective display status indicated for that selected node by the scoping selection. The processor may output the scoped view to a display for display in a graphical user interface (GUI).

16 Claims, 12 Drawing Sheets

(56) References Cited

U.S. PATENT DOCUMENTS

| | | | | |
|---|---|---|---|---|
| 2004/0250015 | A1* | 12/2004 | Ando | G11B 27/034 |
| | | | | 711/112 |
| 2007/0239733 | A1* | 10/2007 | Tanzy | G06F 16/958 |
| 2010/0169393 | A1* | 7/2010 | Fruchter | G06F 3/0605 |
| | | | | 707/828 |
| 2012/0030631 | A1* | 2/2012 | Gonzalez | G06F 9/451 |
| | | | | 715/854 |
| 2012/0144328 | A1 | 6/2012 | Obyrne | |
| 2016/0132817 | A1* | 5/2016 | Kongot | G06Q 10/063114 |
| | | | | 705/7.15 |
| 2016/0314221 | A1* | 10/2016 | Williams | G06F 16/24564 |
| 2017/0017552 | A1* | 1/2017 | Yoda | G06F 11/14 |

OTHER PUBLICATIONS

"Windows 7: Library—Hide or Show in Navigation Pane", published on Nov. 18, 2008 to https://www.sevenforums.com/tutorials/580-library-hide-show-navigation-pane.html, retrieved Oct. 27, 2018 (Year: 2008).*

Lori Kaufman, "Set the Navigation Pane Tree to Automatically Expand in Windows 7", published on Jan. 16, 2012 to https://www.howtogeek.com/102905/set-the-navigation-pane-tree-to-automatically-expand-in-windows-7/, retrieved Oct. 27, 2018 (Year: 2012).*

"International Search Report and Written Opinion Issued in PCT Application No. PCT/US20/028032", dated Jul. 7, 2020, 13 Pages.

* cited by examiner

SCOPED VIEW OF FILE TREE

BACKGROUND

File structures of data stored on computing devices are often represented in graphical user interfaces (GUIs) as file trees. Graphical representations of file trees typically allow users to expand and collapse a branch of a file tree in order to show or hide dependent files for that branch. However, when branches include large numbers of dependent files, the file tree may be difficult for the user to navigate as a result of the user having to look through large numbers of irrelevant files.

SUMMARY

According to one aspect of the present disclosure, a computing device is provided, including a user input device. The computing device may further include memory storing a file tree that includes a plurality of files arranged in a hierarchical structure having a plurality of nodes. The computing device may further include at least one processor configured to receive, via the user input device, a scoping selection of one or more nodes of the plurality of nodes. The scoping selection may indicate a respective display status for each of the one or more nodes. The processor may be further configured to generate a scoped view of the file tree in which for each selected node, whether that selected node is displayed or hidden in the scoped view is determined based at least on the respective display status indicated for that selected node by the scoping selection. The processor may be further configured to output the scoped view to a display for display in a graphical user interface (GUI).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
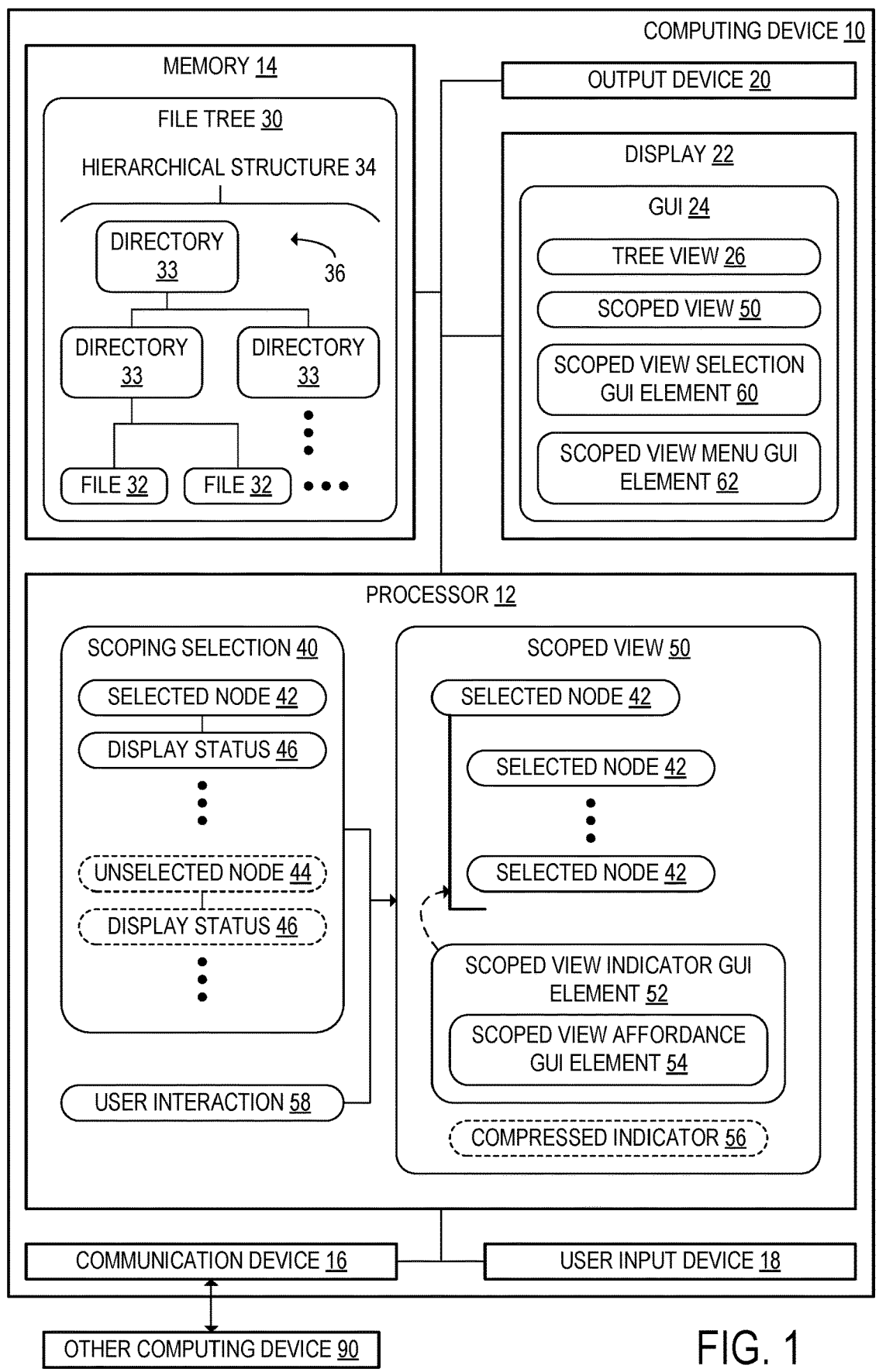
FIG. 1 schematically shows an example computing device including a processor, memory, a user input device, and a display, according to one embodiment of the present disclosure.

FIG. 1 schematically shows an example computing device 10. The computing device 10 may include at least one processor 12 and may further include memory 14 operatively coupled to the processor 12. In some embodiments, the computing device 10 may be configured to communicate with one or more other computing devices 90 via one or more communication devices 16. For example, the computing device 10 may be a server computing device configured to communicate with one or more client computing devices. Additionally or alternatively, functions of the computing device 10 and its components may be distributed across a plurality of physical computing devices operatively coupled via the one or more communication devices 16.

The computing device 10 may further include one or more user input devices 18. For example, the one or more user input devices 18 may include one or more of a keyboard, a mouse, a touchscreen, a trackpad, a camera, a microphone, an accelerometer, an inertial motion unit, and/or one or more other types of user input device 18. Additionally or alternatively, the computing device 10 may include one or more output devices 20. The one or more output devices 20 may include a display 22 configured to display a graphical user interface (GUI) 24, as discussed in further detail below. The one or more output devices 20 may further include one or more of a speaker, a haptic feedback device, and/or one or more other types of output device 20.

The memory 14 of the computing device 10 may store a file tree 30. The file tree 30 may include a plurality of files 32 arranged in a hierarchical structure 34. The hierarchical structure may have a plurality of nodes 36, each of which may be a file 32 or a directory 33 (e.g. a folder). Each directory 33 included in the file tree 30 may have one or more files 32 and/or directories 33 that depend from that directory 33 in the hierarchical structure 34. Thus, each file 32 may be a "leaf" in the file tree 30, and each directory 33 may be a "leaf" if it is empty and a "branch" if it includes one or more files 32 or other directories 33.

As discussed above, the computing device 10 may include a display 22 on which a GUI 24 is displayed. The GUI 24 may graphically represent data output to the display 22 by the processor 12 of the computing device 10. The processor 12 may be configured to output a GUI 24 including a tree view 26 of the file tree 30 for display on the display 22. An example tree view 26 is shown on the left-hand side of FIG. 2A. In the example tree view 26, a plurality of files 32 and directories 33 in the file tree 30 of a server computing device are shown. Each directory 33 shown in the tree view 26 may be an expanded directory 33A or a collapsed directory 33B. The tree view 26 shows each node 36 that depends from an expanded directory 33A and hides each node 36 that depends from a collapsed directory 33B. In some embodiments, each directory 33 in the file tree 30 may be toggled between an expanded view and a collapsed view by selecting that directory 33 with a user interaction 58 received from at least one of the user input devices 18.

Figure 2A:
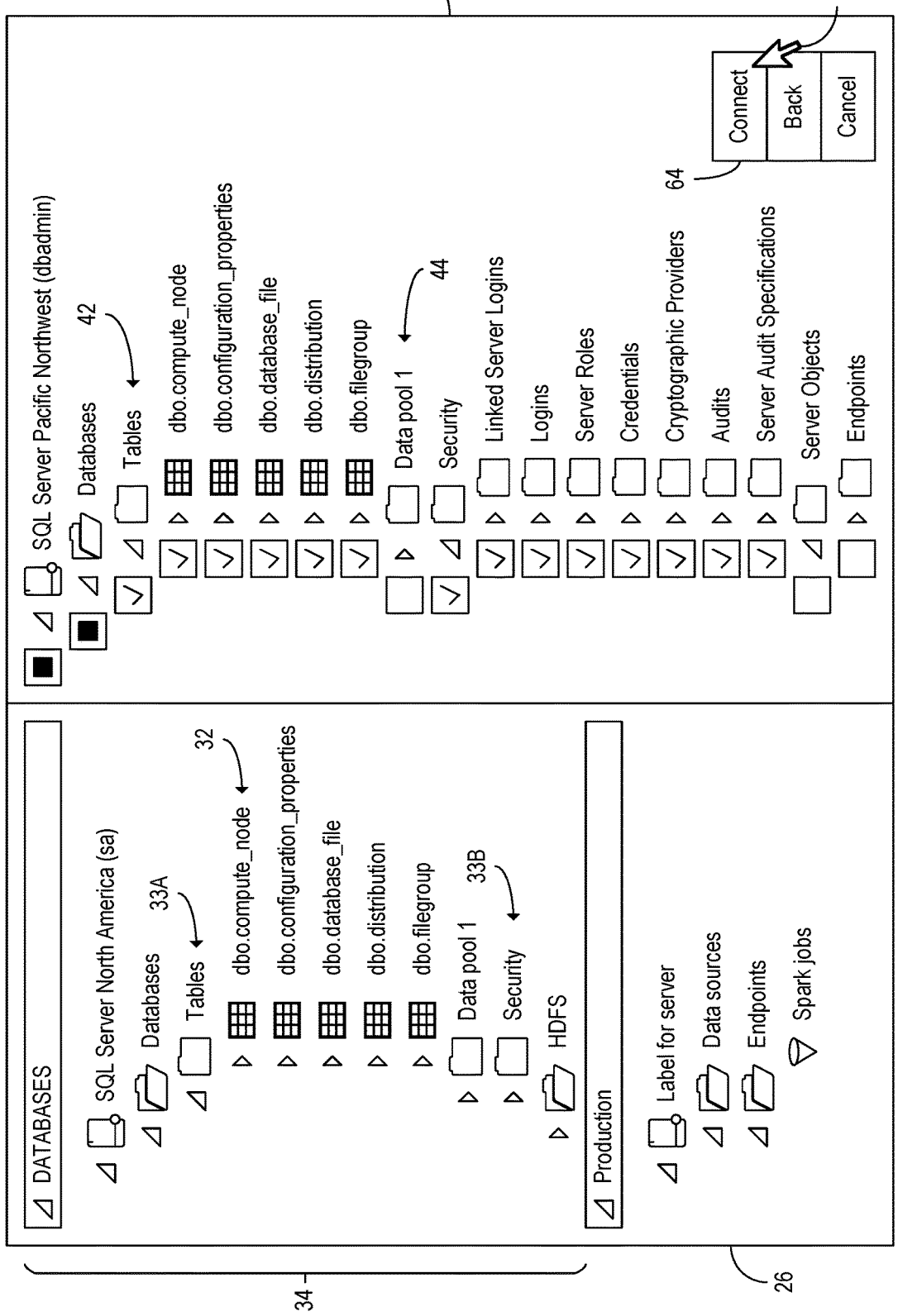
FIG. 2A shows an example graphical user interface including a tree view of a file tree, according to the embodiment of FIG. 1.

As discussed above, when the file tree 30 includes a large number of nodes 36, displaying the file tree 30 in a tree view 26 as in the example of FIG. 2A may result in difficulties navigating the GUI 24 for a user of the computing device 10. For example, when a directory 33 has a large number of dependent nodes 36, the user may have to scroll through a large number of nodes 36 to navigate the tree view 26 when the directory 33 is shown as an expanded directory 33A. This problem may also occur when the user works within two or more different branches of the file tree 30.

In order to address the problem described above, a scoped view 50 may be used instead of the tree view 26. The scoped view 50 may allow the user to view a customized selection of nodes 36 of the file tree 30, thus allowing the user to include portions of the file tree 30 relevant to a task the user is performing while excluding irrelevant portions of the file tree 30. The processor 12 may be configured to receive, via a user input device 18 of the one or more user input devices 18, a scoping selection 40 of one or more nodes 36 of the plurality of nodes 36 included in the file tree 30. The scoping selection 40 may indicate a respective display status 46 for each of the one or more nodes 36 of the file tree 30.

Alternatively, the processor 12 may be configured to receive the scoping selection 40 from another computing device 90. For example, when the computing device 10 is a client computing device, the processor 12 of the computing device 10 may be configured to receive the scoping selection from a server computing device.

In some embodiments, when the processor receives the scoping selection 40 via the one or more user input devices 18, the user may select one or more selected nodes 42 of the plurality of nodes 36 by marking each selected node 42 in a scoped view selection GUI element 60. In such embodiments, prior to receiving the scoping selection 40, the processor 12 may be further configured to generate the scoped view selection GUI element 60 and output the scoped view selection GUI element 60 to the display 22 for display in the GUI 24. The scoping selection 40 of the one or more nodes 36 of the plurality of nodes 36 may then be made at the scoped view selection GUI element 60. An example scoped view selection GUI element 60 is shown on the right-hand side of FIG. 2A, in which the respective display statuses 46 of nodes 36 may be selected by clicking checkboxes associated with those nodes 36. The scoping selection 40 may further include one or more unselected nodes 44. Although, in the embodiment of FIG. 2A, each selected node 42 is selected for inclusion in the scoped view 50, the one or more selected nodes 42 may, in other embodiments, be selected for exclusion from the scoped view 50.

Subsequently to receiving the scoping selection 40, the processor 12 may be further configured to generate the scoped view 50 of the file tree 30. For example, the processor 12 may generate the scoped view 50 in response to a user input providing an instruction to save and/or apply the scoping selection 40. In the example of FIG. 2A, the processor 12 is configured to generate the scoped view 50 in response to the user selecting the "Connect" button 64 with a cursor 48. In the scoped view 50, for each selected node 42, whether that selected node 42 is displayed or hidden in the scoped view 50 may be determined based on the respective display status 46 indicated for that selected node 42 by the scoping selection 40. In the example of FIG. 2A, each node 36 with a checked box is selected for inclusion in the scoped view.

Figure 2B:
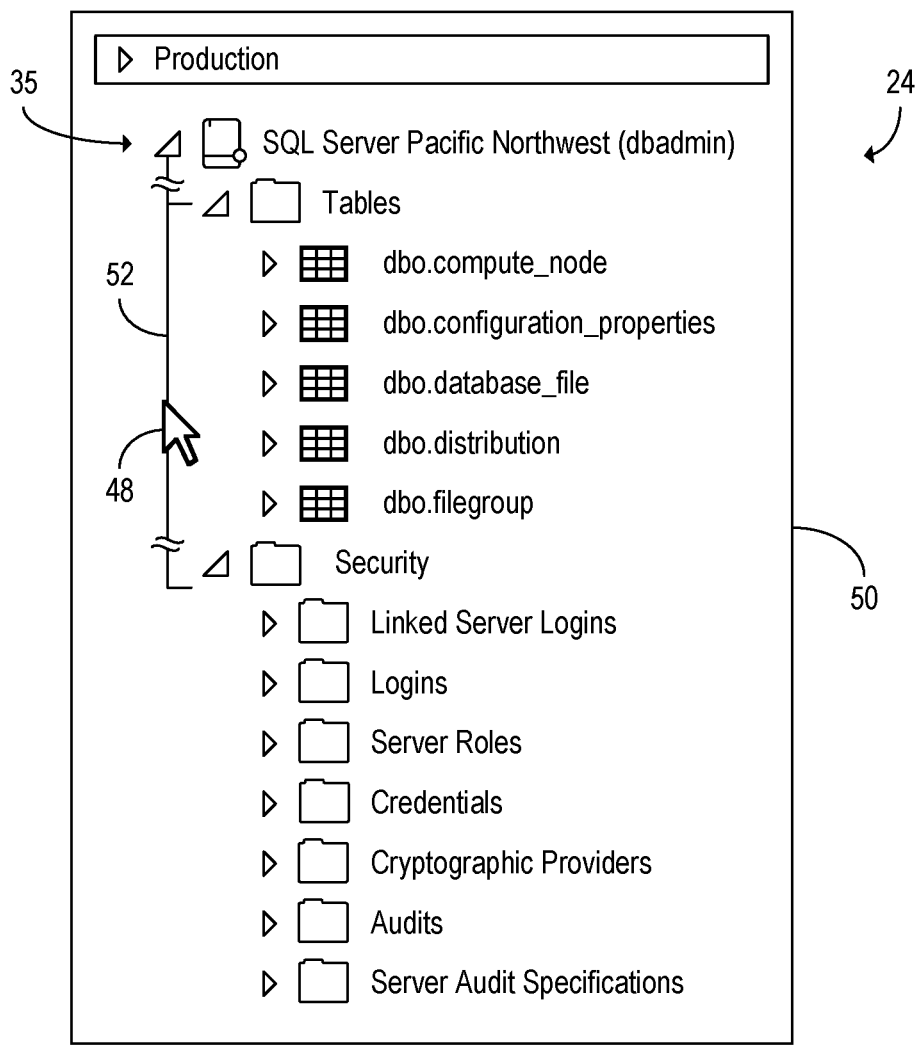
FIG. 2B shows an example scoped view of the file tree, according to the embodiment of FIG. 2A.

The processor 12 may be further configured to output the scoped view 50 to the display 22 for display in the GUI 24. FIG. 2B shows a portion of the GUI 24 of FIG. 2A in which the scoped view 50 is displayed. In FIG. 2B, the directory 33 "Tables," the directory 33 "Security," and the respective files 32 included in those directories 33 are shown, along with a parent directory 35 "SQL Server Pacific Northwest (dbadmin)."

FIG. 2B also shows a scoped view indicator GUI element 52 that indicates which nodes 36 of the file tree 30 are included in the scoped view 50. The scoped view indicator GUI element 52 further serves to indicate that the file tree 30 is currently displayed with the scoped view 50. In the example of FIG. 2B, the scoped view indicator GUI element extends downward from the parent directory 35.

Returning to FIG. 1, the scoped view indicator GUI element 52 may include a scoped view affordance GUI element 54, which may be all or a portion of the scoped view indicator GUI element 52. In embodiments in which the scoped view indicator GUI element includes a scoped view affordance GUI element 54, the processor 12 may be further configured to receive, via the at least one user input device 18, a user interaction 58 with the scoped view affordance GUI element 54. The processor 12 may be further configured to perform an action at the GUI 24 in response to the user interaction 58. Example actions performed in response to the user interaction 58 are discussed in further detail below.

In some embodiments, in response to receiving the user interaction 58, the processor 12 may be configured to exit the scoped view 50 of the file tree 30. In such embodiments, the processor 12 may return the GUI 24 to the tree view 26 shown in FIG. 2A.

Figure 3A:
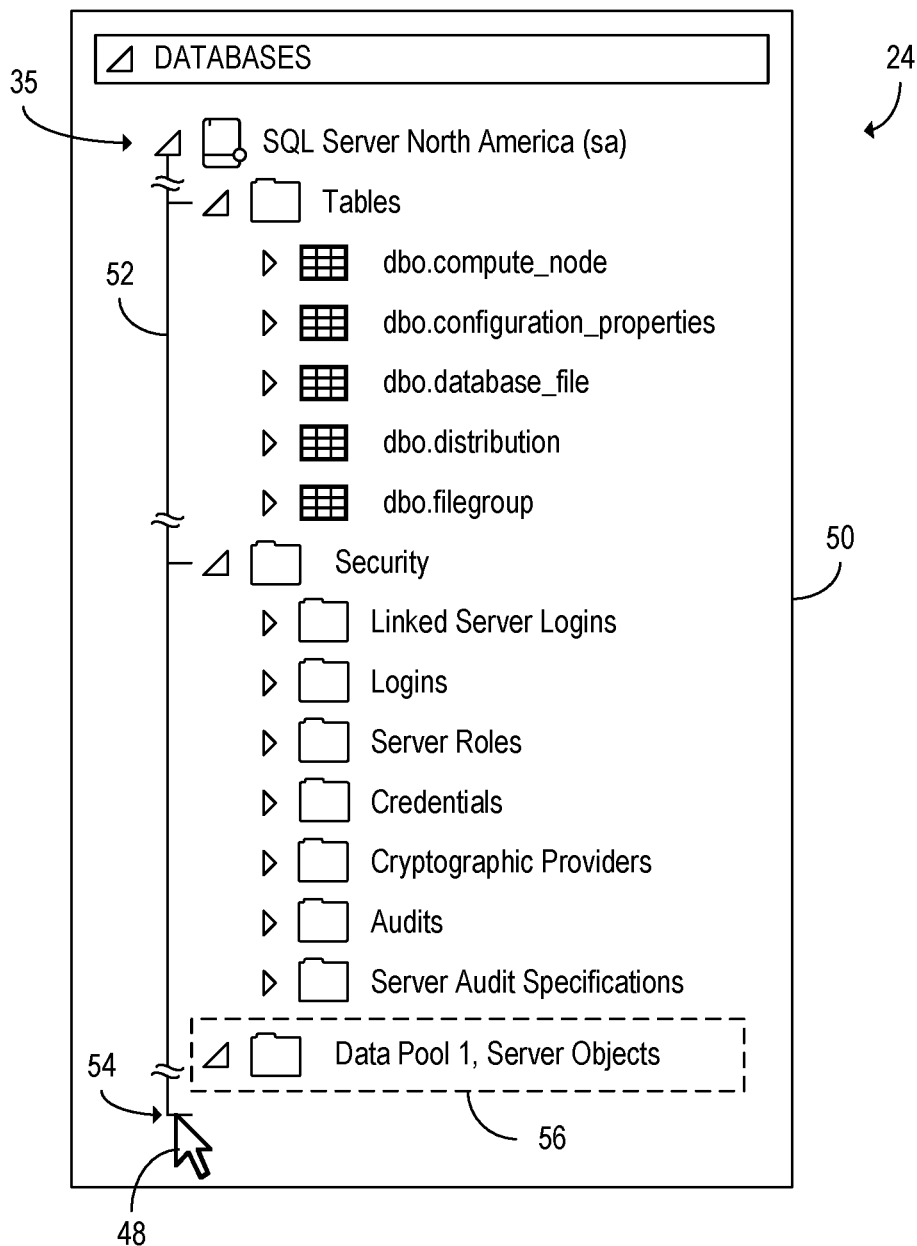
FIG. 3A shows an example scoped view including a scoped view indicator GUI element when a scoped view affordance GUI element of the scoped view indicator GUI element is dragged downward, according to the embodiment of FIG. 2A.
Figure 3B:
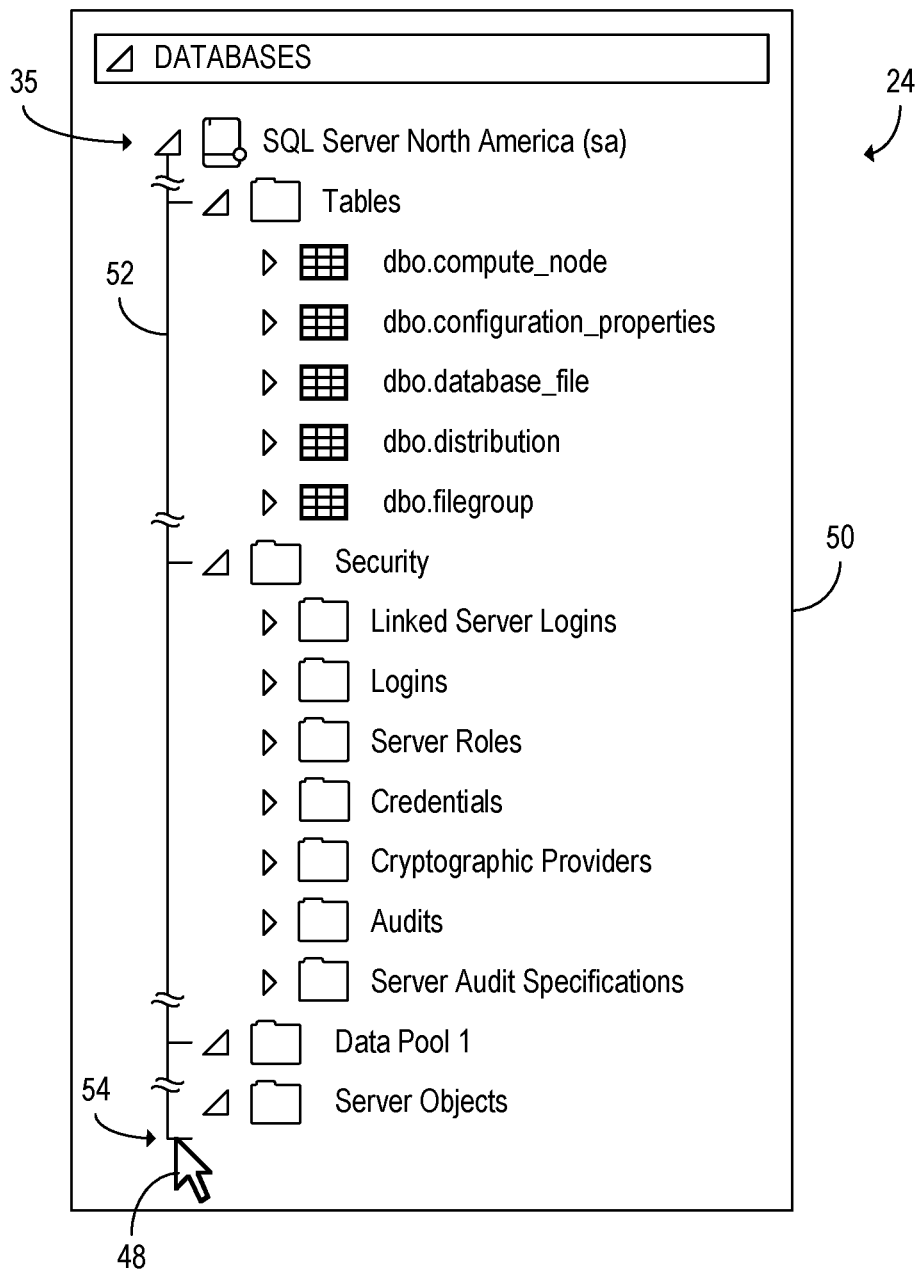
FIG. 3B shows the example scoped view of FIG. 3A after nodes have been added via a user interaction with the scoped view affordance GUI element.

In other embodiments, in response to receiving the user interaction 58, the processor 12 may be configured to modify a display status 46 of at least one node 36 based on the user interaction 58 with the scoped view affordance GUI element 54. Such an embodiment is depicted in FIGS. 3A-B. In FIG. 3A, the scoped view 50 includes a compressed indicator 56 of at least one node 36 having a display status 46 that indicates that it is hidden in the scoped view 50. The compressed indicator 56 may provide a summary of the at least one hidden node 36 and may be smaller than the at least one hidden node 36. In the example of FIG. 3A, the compressed indicator 56 is labeled "Data Pool 1, Server Objects." Thus, the compressed indicator 56 occupies less vertical space than would be occupied by the directories 33 "Data Pool 1" and "Server Objects" in the scoped view 50 while still allowing the user to see that those directories 33 are included in the parent directory 35 "SQL Server North America (dbadmin)."

In the example of FIG. 3A, the user interaction 58 with the scoped view affordance GUI element 54 is a dragging gesture in which a bottom end of the scoped view indicator GUI element 52 is dragged downward with the cursor 48. The dragging gesture may be detected using a mouse, a touchscreen, a trackpad, a proximity touch sensor, a depth camera, or some other user input device 18. In the example of FIG. 3A, the bottom end of the scoped view indicator GUI element 52 is dragged below the compressed indicator 56. In response to this user interaction 58, the directories 33 "Data Pool 1" and "Server Objects" are added to the scoped view 50, as shown in FIG. 3B.

Figure 4A:
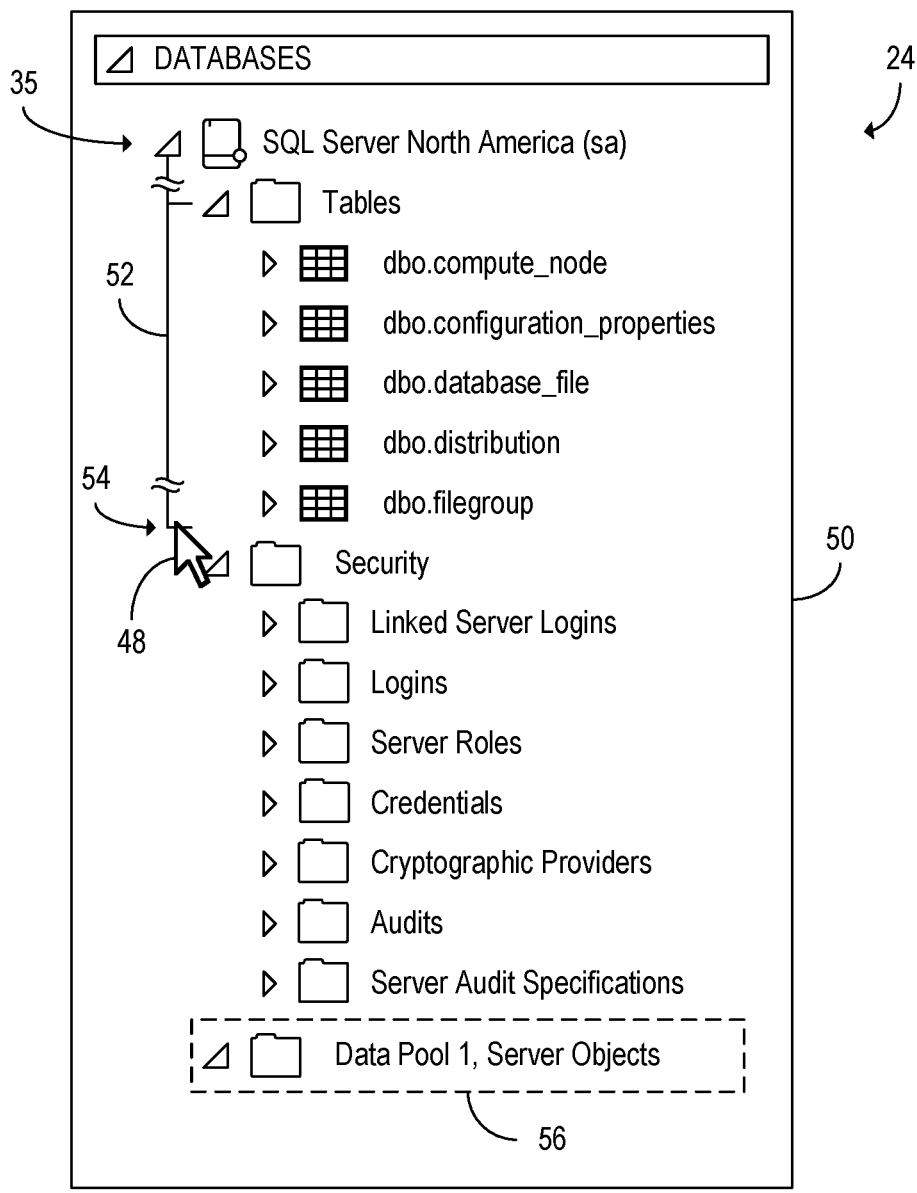
FIG. 4A shows the example scoped view of FIG. 3A when the scoped view affordance GUI element is dragged upward, according to the embodiment of FIG. 3A.
Figure 4B:
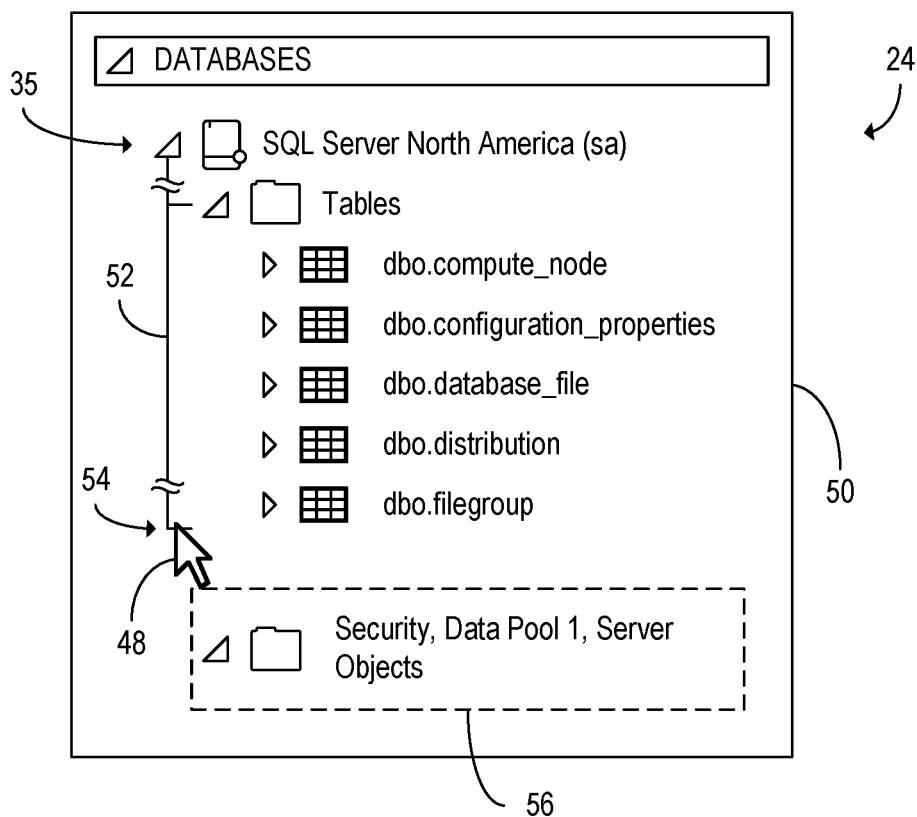
FIG. 4B shows the example scoped view of FIG. 3A after a node has been hidden via a user interaction with the scoped view affordance GUI element.

Alternatively, as shown in FIGS. 4A-B, the user may interact with the scoped view affordance GUI element 54 to hide one or more nodes 36. In the example of FIG. 4A, the scoped view 50 of FIG. 3A is shown when the scoped view indicator GUI element 52 is dragged upward instead of downward. The user interaction 58 with the scoped view affordance GUI element 54 is a dragging gesture in which the bottom end of the scoped view indicator GUI element 52 is dragged upward with the cursor 48 so as to be above the directory 33 "Security." In response to this user interaction 58, the processor 12 may remove the directory 33 "Security" from the scoped view 50, as shown in FIG. 4B. The directory 33 "Security" may instead be added to the compressed indicator 56.

Figure 5:
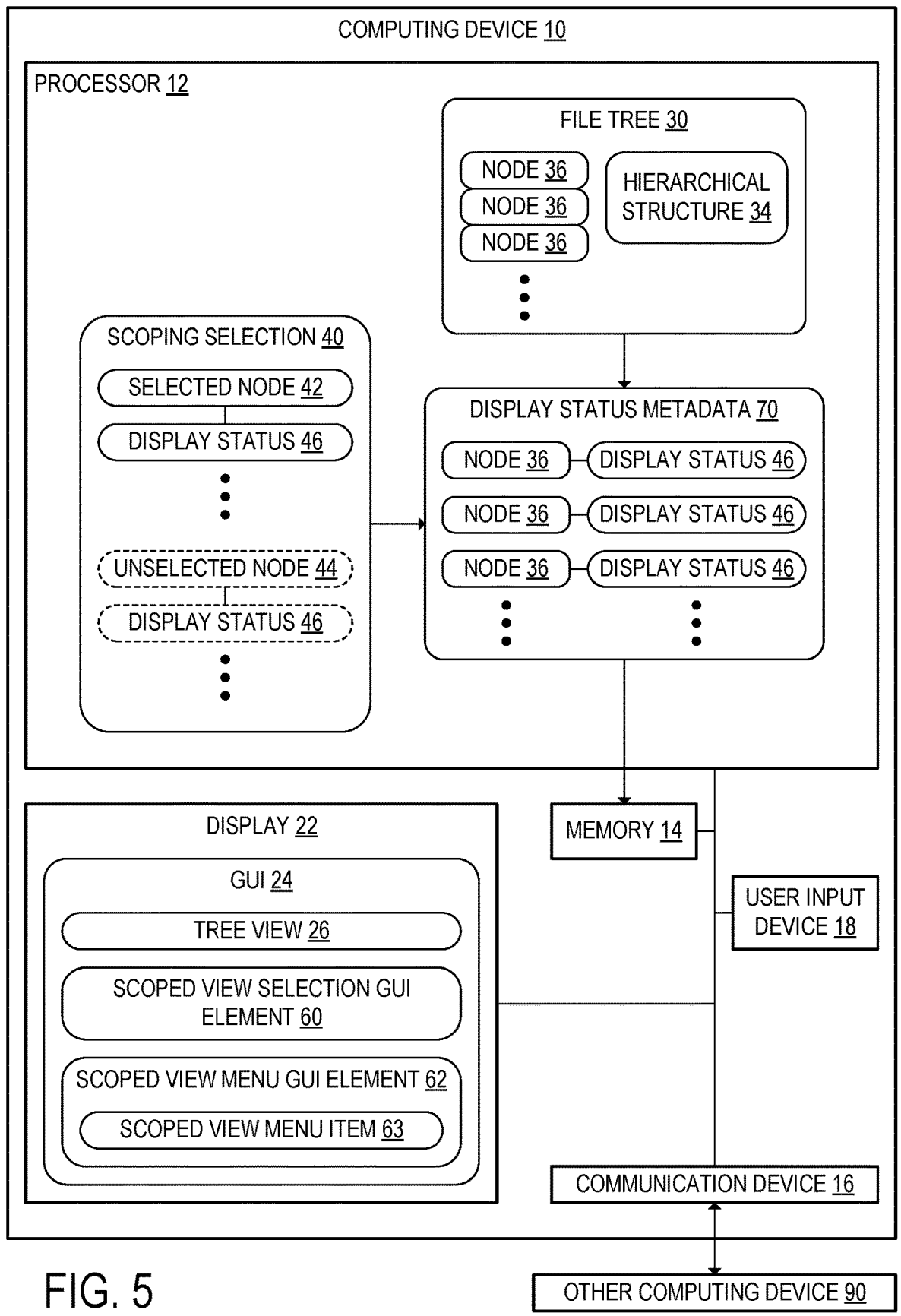
FIG. 5 shows the example computing device of FIG. 1 when display status metadata is stored in the memory.

In some embodiments, as shown in FIG. 5, the memory 14 of the computing device 10 may be further configured to store display status metadata 70 of the file tree 30 indicating the respective display status 46 of each node 36. The processor 12 may be configured to determine the display status metadata 70 based on the file tree 30 and the scoping selection 40. For example, each node 36 may be associated with a display status metadata bit that indicates whether the node 36 has a "displayed" or "hidden" display status 46. In some embodiments, the display status metadata 70 may be encoded in the hierarchical structure 34 of the file tree 30. In other embodiments, the display status metadata 70 may be included in a separate file.

In embodiments in which display status metadata 70 is stored in the memory 14, the processor 12 may be further configured to transmit the display status metadata 70 to another computing device 90. For example, when the computing device 10 is a client computing device, the processor 12 of the computing device 10 may transmit the display status metadata 70 to a server computing device for cloud storage. Accordingly, the same or another client computing device may receive the display status metadata 70 from the server computing device in response to a request to use the scoped view 50 associated with the display status metadata 70. In some embodiments, when the display status metadata 70 is transmitted to another computing device 90, the display status metadata 70 may be included in a file extension that indicates a file system location in the file tree 30.

Figure 6:
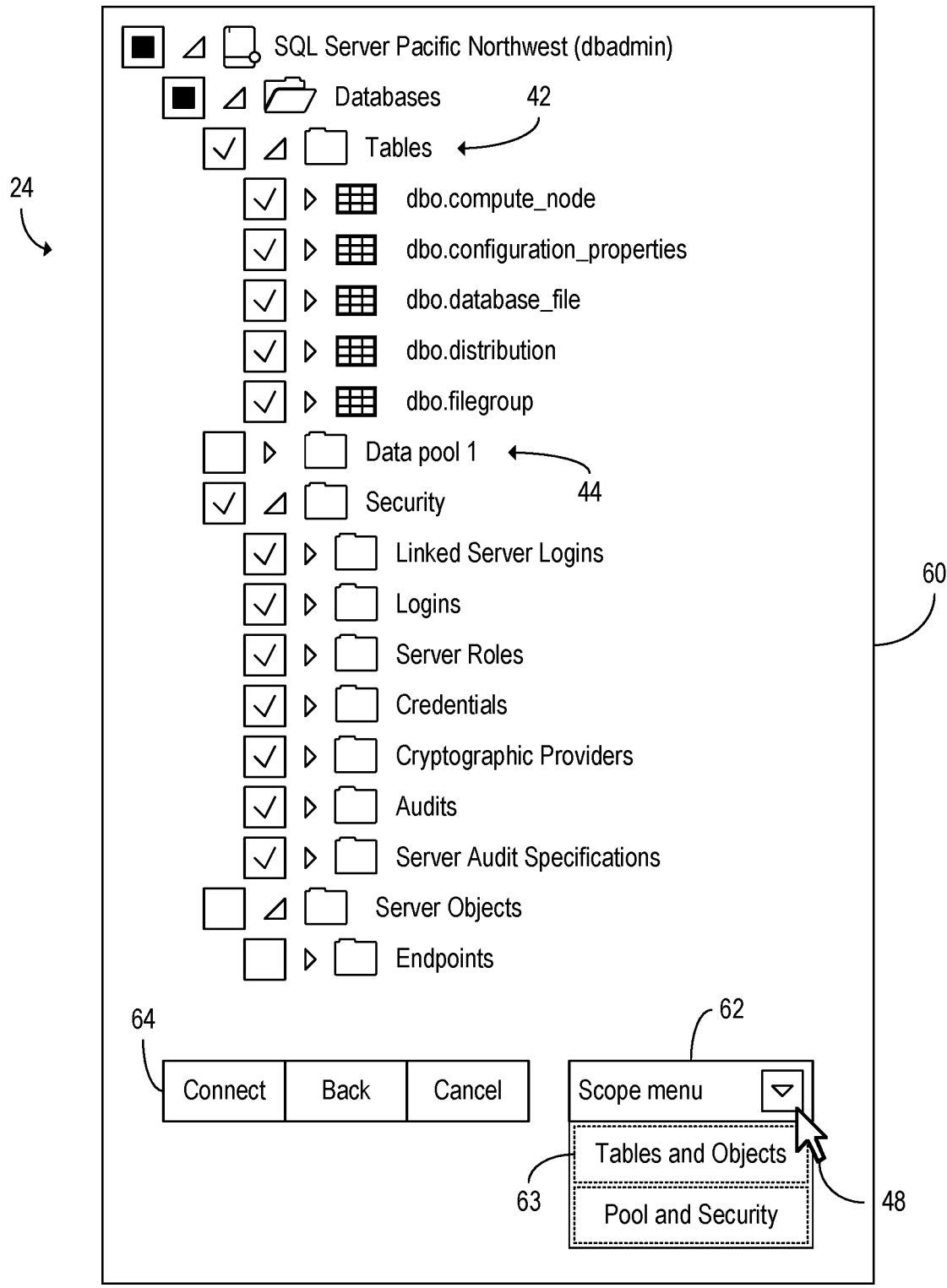
FIG. 6 shows an example scoped view selection GUI element including a scoped view menu GUI element, according to the embodiment of FIG. 5.

In some embodiments, the processor 12 may be further configured to load a previously stored scoping selection 40 from the memory 14 to display a scoped view 50 specified by that scoping selection 40. In such embodiments, the GUI 24 may show a scoped view menu GUI element 62. FIG. 6 shows an example scoped view selection GUI element 60 that includes a scoped view menu GUI element 62. In the example of FIG. 6, the scoped view menu GUI element 62 includes two scoped view menu items 63 respectively associated with stored sets of display status metadata 70. These scoped view menu items 63, labeled "Tables and Objects" and "Pool and Security," may represent scoping selections 40 previously made by the user or received from another computing device 90. The processor 12 may be configured to output the scoped view 50 to the display 22 for display in the GUI 24 in response to receiving, at the scoped view menu GUI element 62, a selection of the scoped view menu item 63 associated with the display status metadata 70 of the scoped view 50. Thus, the processor 12 may be configured to apply a previously saved scoping selection 40.

Figure 7A:
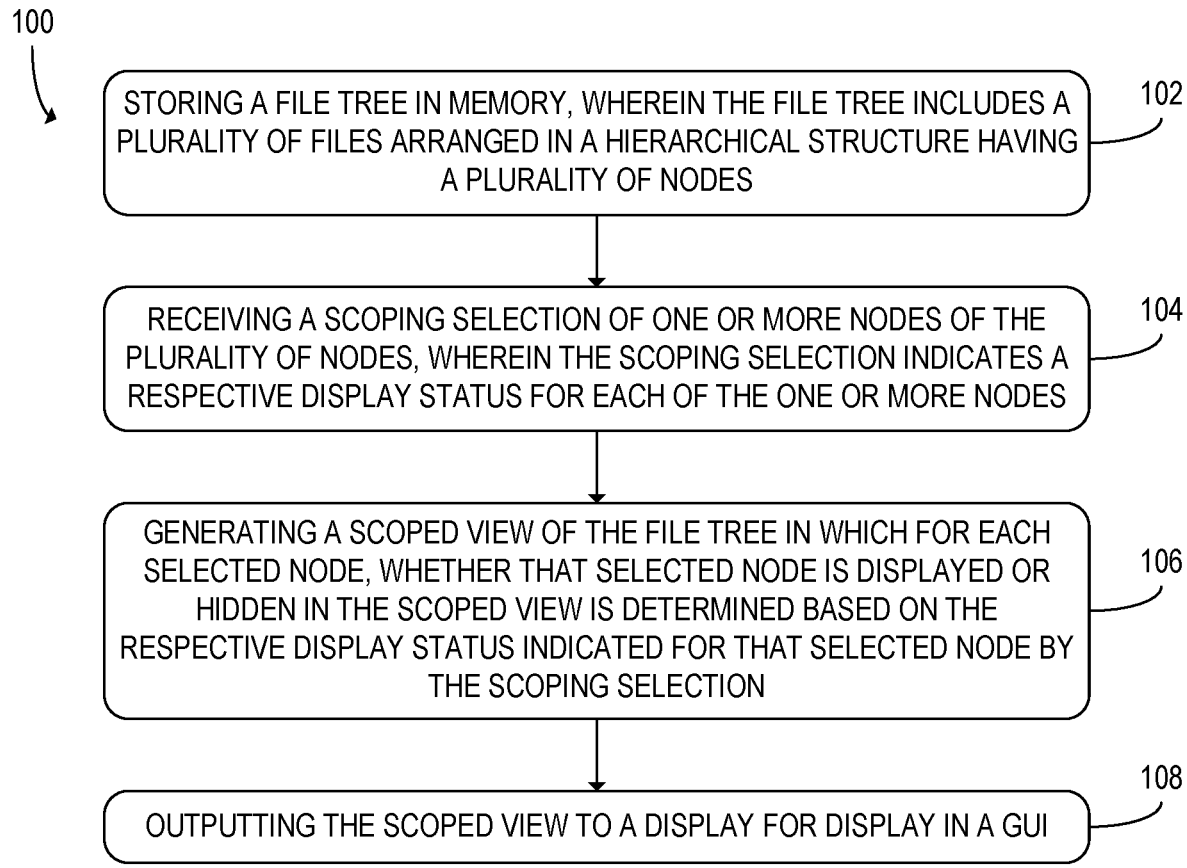
FIG. 7A shows a flowchart of a method for use with a computing device, according to the embodiment of FIG. 1.

FIGS. 7A-D show a flowchart of a method 100 for use with a computing device. The method 100 may be used with the computing device of FIG. 1 or with some other computing device. As shown in FIG. 7A, the method 100 may include, at step 102, storing a file tree in memory. The file tree may include a plurality of files arranged in a hierarchical structure having a plurality of nodes. At step 104, the method 100 may further include receiving a scoping selection of one or more nodes of the plurality of nodes. For example, the scoping selection may be received via user interaction with the GUI using a user input device. Additionally or alternatively, the scoping selection may be received from another computing device via at least one communication device. The scoping selection may indicate a respective display status for each of the one or more nodes.

At step 106, the method 100 may further include generating a scoped view of the file tree. In the scoped view, for each selected node, whether that selected node is displayed or hidden in the scoped view may be determined based on the respective display status indicated for that selected node by the scoping selection. For example, the scoped view may show each node that was marked by the user when generating the scoping selection. Alternatively, the user may mark one or more nodes to hide. At step 108, the method 100 may further include outputting the scoped view to a display for display in a GUI.

Figure 7B:
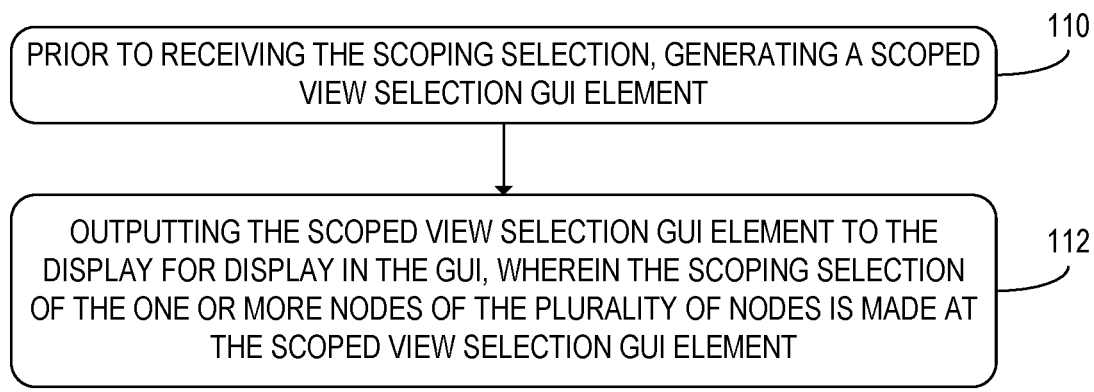
FIGS. 7B-D show additional steps of the method of FIG. 7A that may be performed in some embodiments.

FIG. 7B shows additional steps of the method 100 that may be performed prior to receiving the scoping selection in some embodiments. At step 110, the method 100 may further include generating a scoped view selection GUI element. The scoped view selection GUI element may be an interactable GUI element configured to receive one or more user interactions from at least one user input device. At step 112, the method 100 may further include outputting the scoped view selection GUI element to the display for display in the GUI. The scoping selection of the one or more nodes of the plurality of nodes may then be made at the scoped view selection GUI element.

Figure 7C:
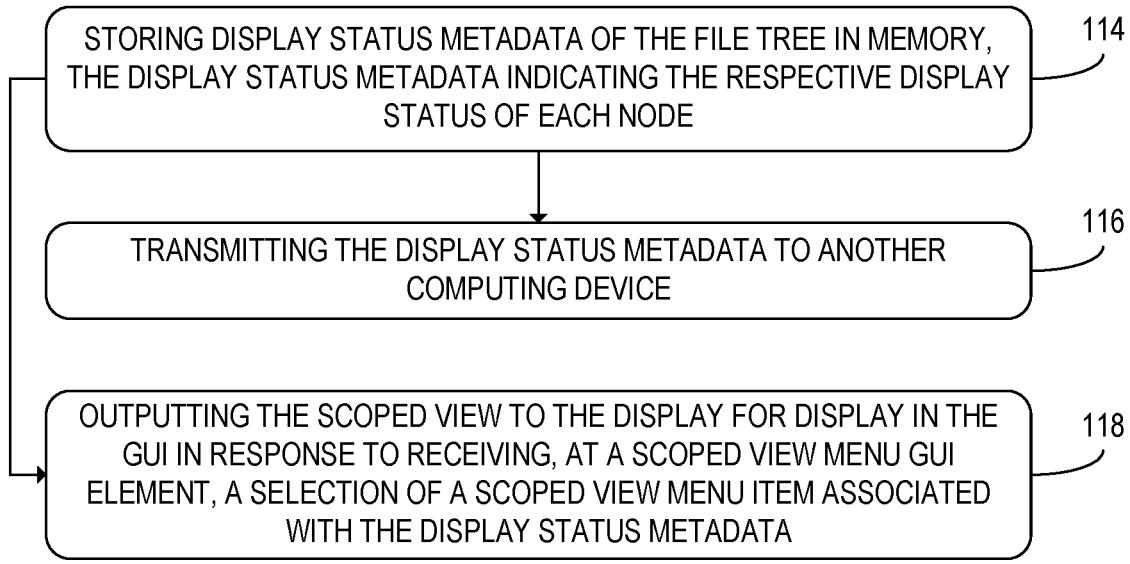

FIG. 7C shows additional steps of the method 100 that may be performed in some embodiments. At step 114, the method 100 may further include storing display status metadata of the file tree in memory. The display status metadata may indicate the respective display status of each node included in the file tree. In some embodiments, the display status metadata may be stored as part of the hierarchical structure of the file tree. In other embodiments, the respective display statuses of the nodes may be stored in a separate file. At step 116, the method 100 may further include transmitting the display status metadata to another computing device. For example, display status metadata specifying a scoped view may be uploaded to and downloaded from a server computing device by a client computing device. As another example, the display status metadata may be received from another computing device along with a file path. Thus, when the file path is opened, the file tree may be displayed with a scoped view defined by the received display status metadata.

Additionally or alternatively, at step 118, the method 100 may further include outputting the scoped view to the display for display in the GUI in response to receiving, at a scoped view menu GUI element, a selection of a scoped view menu item associated with the display status metadata. The scoped view menu GUI element may be included in the scoped view selection GUI element discussed above. The scoped view menu item may indicate a set of display status metadata stored in the memory. The scoped view defined by the display status metadata associated with the scoped view menu item may be loaded in response to the user selecting the scoped view menu item in the GUI.

Figure 7D:
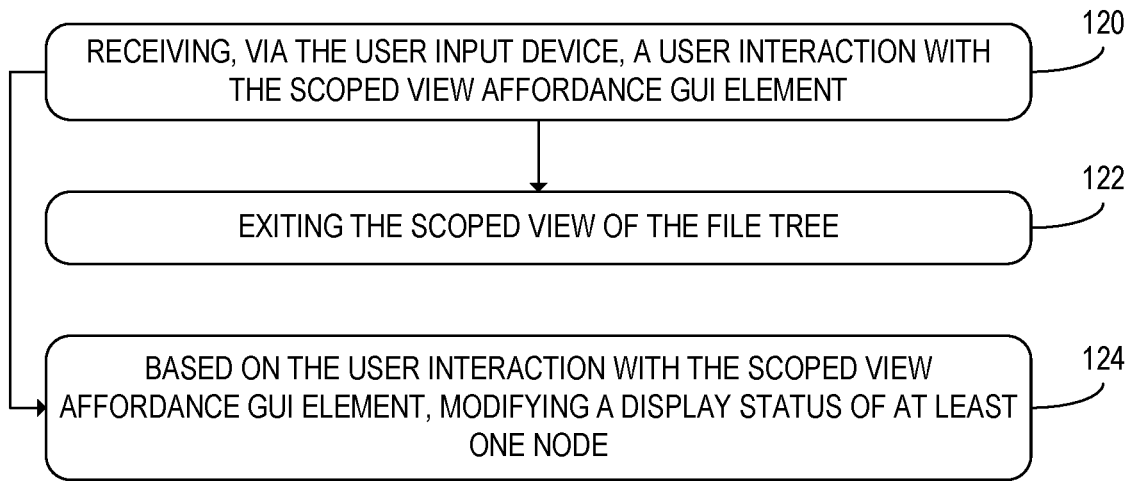

In some embodiments, the scoped view may include a scoped view indicator GUI element that indicates the one or more nodes included in the scoped view. For example, the scoped view indicator GUI element may be a branched line that points to each node included in the scoped view. The scoped view indicator GUI element may include a scoped view affordance GUI element configured to receive a user interaction. FIG. 7D shows additional steps of the method 100 that may be performed in embodiments in which a scoped view indicator GUI element including a scoped view affordance GUI element is displayed. At step 120, the method 100 may further include receiving, via the user input device, a user interaction with the scoped view affordance GUI element. For example, the user interaction may be a dragging gesture, which may be detected using a mouse, a touchscreen, a trackpad, a proximity touch sensor, a depth camera, or some other user input device.

At step 122, the method 100 may further include exiting the scoped view of the file tree in response to the user interaction. Alternatively, at step 124, the method 100 may further include modifying a display status of at least one node based on the user interaction with the scoped view affordance GUI element. The user interaction may be an instruction to add one or more nodes to the scoped view and/or remove one or more nodes from the scoped view.

In some embodiments, the scoped view may include a compressed indicator of at least one node having a respective display status indicating that node as hidden. For example, the compressed indicator may be labeled " . . . And 20 others" when a currently displayed branch of the file tree includes 20 nodes not shown in the scoped view. In some embodiments, the user interaction with the scoped view affordance GUI element may include an instruction to add one or more nodes summarized in the compressed indicator to the scoped view.

By using the scoped view described above, the user of the computing device may view relevant portions of the file tree while hiding irrelevant portions. This may be done even when portions of the file tree which the user wishes to view would be separated by a large number of irrelevant nodes if viewed according to existing methods for displaying file trees. Thus, the systems and methods described above may allow the user to work with the file tree more efficiently due to not having to spend as much time looking through the file tree for desired files or folders. The systems and methods described above may also allow the user to define, save, and load a plurality of different scoped views suited to different tasks. This may allow the user to switch between tasks more quickly by switching to a different predefined scoped view rather than having to expand and/or collapse multiple nodes of the file tree to obtain the desired view.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
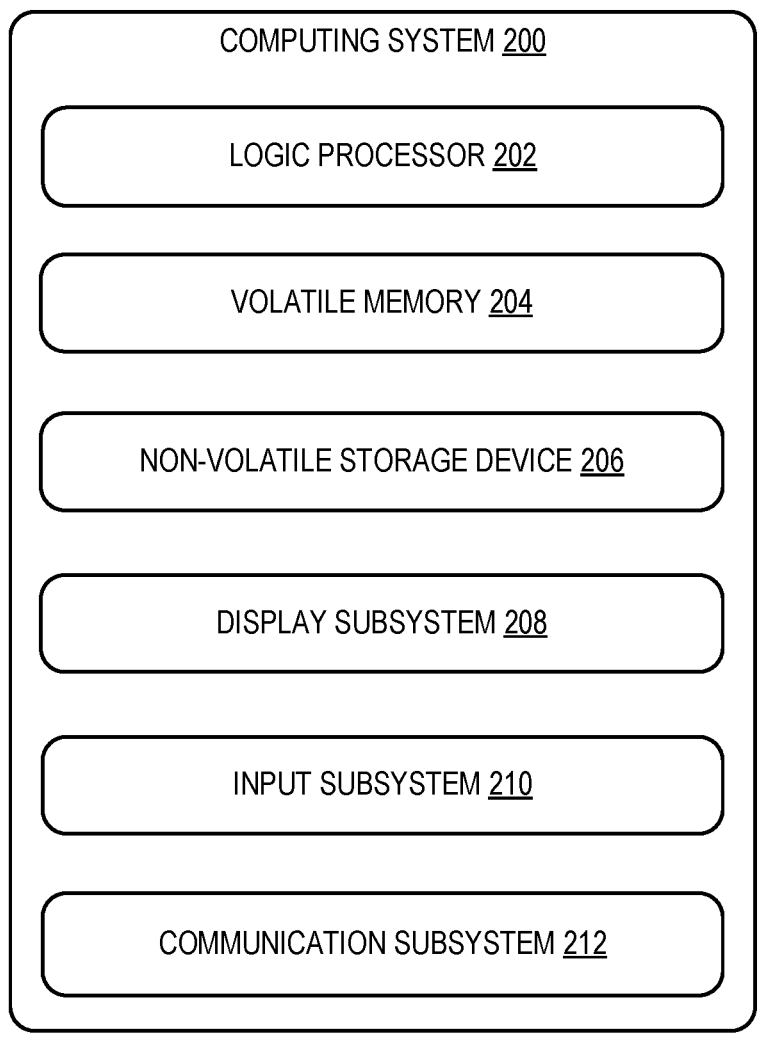
FIG. 8 shows a schematic view of an example computing environment in which the computer device of FIG. 1 may be enacted.

FIG. 8 schematically shows a non-limiting embodiment of a computing system 200 that can enact one or more of the methods and processes described above. Computing system 200 is shown in simplified form. Computing system 200 may embody the computing device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 8.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

According to one aspect of the present disclosure, a computing device is provided, including a user input device. The computing device may further include memory storing a file tree that includes a plurality of files arranged in a hierarchical structure having a plurality of nodes. The computing device may further include at least one processor configured to receive, via the user input device, a scoping selection of one or more nodes of the plurality of nodes. The scoping selection may indicate a respective display status for each of the one or more nodes. The processor may be further configured to generate a scoped view of the file tree in which for each selected node, whether that selected node is displayed or hidden in the scoped view is determined based at least on the respective display status indicated for that selected node by the scoping selection. The processor may be further configured to output the scoped view to a display for display in a graphical user interface (GUI).

According to this aspect, prior to receiving the scoping selection, the processor may be further configured to generate a scoped view selection GUI element and output the scoped view selection GUI element to the display for display in the GUI. The scoping selection of the one or more nodes of the plurality of nodes may be made at the scoped view selection GUI element.

According to this aspect, the memory may store display status metadata of the file tree indicating the respective display status of each node.

According to this aspect, the processor may be further configured to transmit the display status metadata to another computing device.

According to this aspect, the processor may be configured to output the scoped view to the display for display in the GUI in response to receiving, at a scoped view menu GUI element, a selection of a scoped view menu item associated with the display status metadata.

According to this aspect, the scoped view may include a scoped view indicator GUI element.

According to this aspect, the scoped view indicator GUI element may include a scoped view affordance GUI element.

According to this aspect, the processor may be configured to receive, via the user input device, a user interaction with the scoped view affordance GUI element. The processor may be configured to exit the scoped view of the file tree.

According to this aspect, the processor may be configured to receive, via the user input device, a user interaction with the scoped view affordance GUI element. Based on the user interaction with the scoped view affordance GUI element, the processor may be configured to modify a display status of at least one node.

According to this aspect, the user interaction with the scoped view affordance GUI element may be a dragging gesture.

According to this aspect, the scoped view may further include a compressed indicator of at least one node having a respective display status indicating that node as hidden.

According to another aspect of the present disclosure, a method for use with a computing device is provided. The method may include storing a file tree in memory. The file tree may include a plurality of files arranged in a hierarchical structure having a plurality of nodes. The method may further include receiving a scoping selection of one or more nodes of the plurality of nodes. The scoping selection may indicate a respective display status for each of the one or more nodes. The method may further include generating a scoped view of the file tree in which for each selected node, whether that selected node is displayed or hidden in the scoped view is determined based on the respective display status indicated for that selected node by the scoping selection. The method may further include outputting the scoped view to a display for display in a graphical user interface (GUI).

According to this aspect, the method may further include, prior to receiving the scoping selection, generating a scoped view selection GUI element. The method may further include outputting the scoped view selection GUI element to the display for display in the GUI. The scoping selection of the one or more nodes of the plurality of nodes may be made at the scoped view selection GUI element.

According to this aspect, the method may further include storing display status metadata of the file tree in memory. The display status metadata may indicate the respective display status of each node.

According to this aspect, the method may further include transmitting the display status metadata to another computing device.

According to this aspect, the method may further include outputting the scoped view to the display for display in the GUI in response to receiving, at a scoped view menu GUI element, a selection of a scoped view menu item associated with the display status metadata.

According to this aspect, the scoped view may include a scoped view indicator GUI element. The scoped view indicator GUI element may include a scoped view affordance GUI element.

According to this aspect, the method may further include receiving, via the user input device, a user interaction with the scoped view affordance GUI element. The method may further include exiting the scoped view of the file tree.

According to this aspect, the method may further include receiving, via the user input device, a user interaction with the scoped view affordance GUI element. The method may further include, based on the user interaction with the scoped view affordance GUI element, modifying a display status of at least one node.

According to another aspect of the present disclosure, a computing device is provided, including memory storing a file tree that includes a plurality of files arranged in a hierarchical structure having a plurality of nodes. The computing device may further include at least one processor configured to receive, from another computing device, a scoping selection of one or more nodes of the plurality of nodes. The scoping selection may indicate a respective display status for each of the one or more nodes. The processor may be further configured to generate a scoped view of the file tree in which for each selected node, whether that selected node is displayed or hidden in the scoped view is determined based on the respective display status indicated for that selected node by the scoping selection. The processor may be further configured to output the scoped view to a display for display in a graphical user interface (GUI).

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a user input device;
memory storing a file tree that includes a plurality of files arranged in a hierarchical structure having a plurality of nodes; and
at least one processor configured to:
receive, via the user input device, a scoping selection of one or more nodes of the plurality of nodes, the scoping selection indicating a respective display status for each of the one or more nodes;
generate an expandable, scoped view of the file tree in which for each selected node, whether that selected node is displayed or hidden in the expandable, scoped view is determined based at least on the respective display status indicated for that selected node by the scoping selection; and
output the expandable, scoped view to a display for display in a graphical user interface (GUI), the expandable, scoped view including:
a scoped view indicator GUI element including an indication of which nodes are included in the expandable, scoped view, the scoped view indicator GUI element further including a scoped view affordance GUI element configured to mediate user interactions resulting in a modification of a display status of at least one node, wherein the user interaction with the scoped view affordance GUI element is a dragging gesture; and
a compressed indicator of at least one node having a respective display status indicating that node as hidden.

2. The computing device of claim 1, wherein the memory stores display status metadata of the file tree indicating the respective display status of each node.

3. The computing device of claim 2, wherein the processor is further configured to transmit the display status metadata to another computing device.

4. The computing device of claim 2, wherein the processor is configured to output the expandable, scoped view to the display for display in the GUI in response to receiving, at a scoped view menu GUI element, a selection of a scoped view menu item associated with the display status metadata.

5. The computing device of claim 1, wherein the processor is further configured to:
receive, via the user input device, a user interaction with the scoped view affordance GUI element; and
exit the expandable, scoped view of the file tree.

6. The computing device of claim 5, wherein the scoping selection is received when the file tree is presented for display in a tree view, different from the expandable, scoped view.

7. The computing device of claim 6, wherein exiting the expandable, scoped view further includes presenting the tree view for display.

8. The computing device of claim 1, wherein:
prior to receiving the scoping selection, the processor is further configured to generate a scoped view selection GUI element and output the scoped view selection GUI element to the display for display in the GUI; and
the scoping selection of the one or more nodes of the plurality of nodes is made at the scoped view selection GUI element.

9. The computing device of claim 8, wherein the scoped view selection GUI element is not presented for display in the expandable, scoped view.

10. The computing device of claim 1, wherein the expandable, scoped view includes two or more compressed indicators that are non-adjacent.

11. A method for use with a computing device, the method comprising:
storing a file tree in memory, wherein the file tree includes a plurality of files arranged in a hierarchical structure having a plurality of nodes;
receiving a scoping selection of one or more nodes of the plurality of nodes, wherein the scoping selection indicates a respective display status for each of the one or more nodes;
generating an expandable, scoped view of the file tree in which for each selected node, whether that selected node is displayed or hidden in the expandable, scoped view is determined based on the respective display status indicated for that selected node by the scoping selection; and
outputting the expandable, scoped view to a display for display in a graphical user interface (GUI), the expandable, scoped view including:
a scoped view indicator GUI element including an indication of which nodes are included in the expandable, scoped view, the scoped view indicator GUI element further including a scoped view affordance GUI element configured to mediate user interactions resulting in a modification of a display status of at least one node, wherein the user interaction with the scoped view affordance GUI element is a dragging gesture; and
a compressed indicator of at least one node having a respective display status indicating that node as hidden.

12. The method of claim 11, further comprising storing display status metadata of the file tree in memory, the display status metadata indicating the respective display status of each node.

13. The method of claim 12, further comprising transmitting the display status metadata to another computing device.

14. The method of claim 12, further comprising outputting the expandable, scoped view to the display for display in the GUI in response to receiving, at a scoped view menu GUI element, a selection of a scoped view menu item associated with the display status metadata.

15. The method of claim 11, further comprising:
receiving, via the user input device, a user interaction with the scoped view affordance GUI element; and
exiting the expandable, scoped view of the file tree.

16. A computing device comprising:
memory storing a file tree that includes a plurality of files arranged in a hierarchical structure having a plurality of nodes; and
at least one processor configured to:
receive, from another computing device, a scoping selection of one or more nodes of the plurality of nodes, wherein the scoping selection indicates a respective display status for each of the one or more nodes;
generate an expandable, scoped view of the file tree in which for each selected node, whether that selected node is displayed or hidden in the expandable, scoped view is determined based on the respective display status indicated for that selected node by the scoping selection; and
output the expandable, scoped view to a display for display in a graphical user interface (GUI), the expandable, scoped view including:
a scoped view indicator GUI element including an indication of which nodes are included in the expandable, scoped view, the scoped view indicator GUI element further including a scoped view affordance GUI element configured to mediate user interactions resulting in a modification of a display status of at least one node; and
a compressed indicator of at least one node having a respective display status indicating that node as hidden, wherein the user interaction with the scoped view affordance GUI element is a dragging gesture, wherein dragging the scoped view affordance GUI element past the compressed indicator results in one or more hidden nodes being added to the expandable, scoped view, and wherein dragging the scoped view affordance GUI element past a displayed node results in the displayed node being hidden and added to the compressed indicator.

* * * * *